March 24, 1936. P. T. SPRAGUE ET AL Re. 19,902
PRESSURE GAUGE
Original Filed Oct. 8, 1926 2 Sheets-Sheet 1
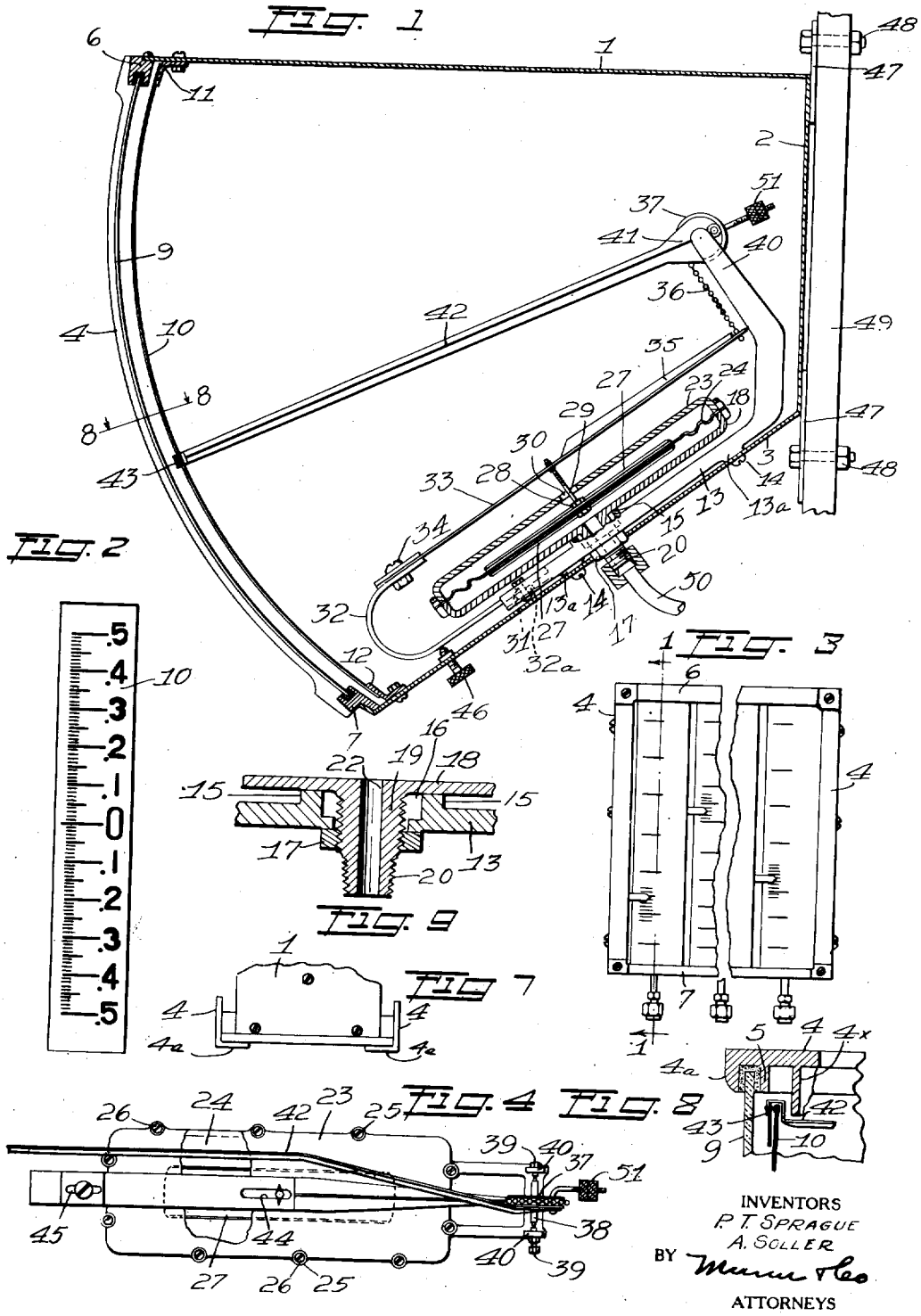
INVENTORS
P. T. SPRAGUE
A. SOLLER
BY Munn & Co
ATTORNEYS March 24, 1936. P. T. SPRAGUE ET AL Re. 19,902
PRESSURE GAUGE
Original Filed Oct. 8, 1926 2 Sheets-Sheet 2
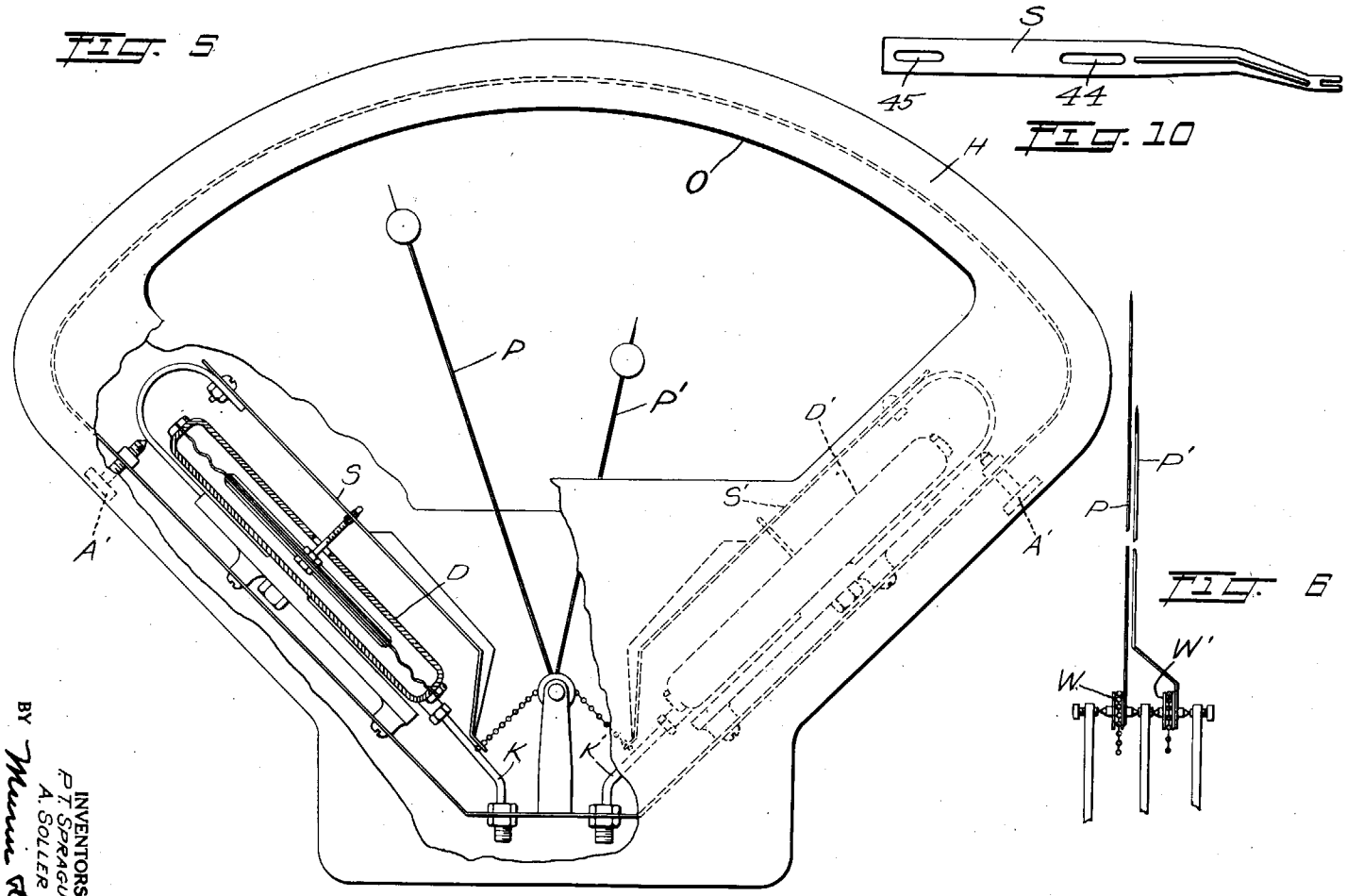
INVENTORS
P. T. SPRAGUE
A. SOLLER
BY Munn & Co.
ATTORNEYS Reissued Mar. 24, 1936

Re. 19,902

UNITED STATES PATENT OFFICE 19,902

PRESSURE GAUGE

Philip Tripp Sprague and Arnold Soller, Michigan City, Ind., assignors to The Hays Corporation, Michigan City, Ind.

Original No. 1,841,651, dated January 19, 1932, Serial No. 140,315, October 8, 1926. Application for reissue January 15, 1934, Serial No. 706,786

16 Claims. (Cl. 73—110)

Our invention relates to improvements in gauges that are designed to be used for indicating or recording pressures, and it consists in the combinations, constructions, and arrangements herein described and claimed.

An object of our invention is to provide a gauge primarily for indicating relatively slight pressures, such as drafts in chimneys, furnaces, and the like, and in which the movement of a diaphragm is greatly multiplied so that a slight change in the pressure may be readily observed on the scale at a considerable distance from the latter.

A further object is to provide a gauge of the type mentioned, which is housed in a casing that is relatively narrow, so that a number of these gauges may be placed side by side on an instrument board or other suitable support where they will take up very little room.

A further object is to provide a gauge in which the actuating mechanism is disposed in compact arrangement in one end of the housing, thereby permitting a wide range of movement for the pointer through the space in the remainder of the housing.

A further object is to provide a device having an elongated diaphragm, by means of which a slight pressure is augmented, but which, being elongated, may be readily contained within the narrow housing.

A further object is to provide a device of the type described in which a spring member actuated by the movement of the diaphragm is bent back over the diaphragm casing, thereby rendering the device compact, while at the same time providing a long lever arm.

A further object is to provide simple means operated from the outside of the casing for adjusting the device to bring the pointer to its zero position.

A further object is to provide novel and simple means for calibrating, amplifying and transmitting movement of a diaphragm to a pointer.

Other objects and advantages will appear in the following specification, and the novel features of the invention will be particularly pointed out in the appended claims.

Our invention is illustrated in the accompanying drawings, forming part of this application, in which Figure 1 is an enlarged section through the device along line 1—1 of Figure 3, Figure 2 is a face view of one of the scales used in the device, Figure 3 is a face view showing the general arrangement of a plurality of gauges mounted side by side, Figure 4 is a detail plan view of a portion of the device, Figure 5 is a face view of a modified form, Figure 6 is a detail side view of the pointers and their immediate actuating mechanism shown in Figure 5, Figure 7 is a fragmentary detail view of a portion of the top of the device shown in Figure 1, Figure 8 is a section along the line 8—8 of Figure 1, Figure 9 is a detail sectional view along the line 1—1 of Figure 3 showing a means for mounting the diaphragm casing, Figure 10 is a view of a modified form of the spring arm used in connection with the apparatus set forth in Figure 5.

In carrying out our invention we provide a housing such as that shown in Figure 1. It comprises a flat strip of metal bent to form a top portion 1, a back portion 2, and a bottom portion 3. The front consists preferably of cast aluminum side pieces 4, which are provided with laterally extending flanges 4a, see Figure 7, and ribs 5, see Figure 8. The sides are connected together by upper and lower cross members 6 and 7, respectively, which are grooved. An arc shaped pane of glass 9 is disposed between the flange 4a and the rib 5 of the side pieces and in the grooves of the upper and lower cross pieces 6 and 7, and is suitably packed to prevent displacement. The upper portion 1 of the casing or housing is secured to the cross piece 6. The lower portion of the casing is bent upwardly and is secured to the cross piece 7.

A scale such as that shown at 10 in Figures 1 and 3 is bent in arc shape and is secured to upper and lower brackets 11 and 12, respectively, which are in turn secured to the upper and lower members of the casing.

In the interior is disposed a light casting 13 of substantially L-shape. This casting has bosses 13a and screws 14 passing through the casing and into the bosses for holding the casting or frame 13 securely. The frame 13 also has a central boss 15 on its opposite side which is provided with an opening 16, see Figure 9.

The diaphragm casing consists of a lower portion 18 having a stud 19 provided with a threaded portion 20. The stud passes through the opening 16 in the boss 15 and there is a bore 22 which extends through the stud and into the interior of the diaphragm casing. When the nut 17 is screwed onto the stud, it will draw the casing portion 18 securely down on the boss 15, thereby holding it firmly in position.

Clamped between the casing portion 18 and a cover portion 23 is a diaphragm 24. As will be observed from Figure 4, the diaphragm casing is elongated and is provided with bosses 25 having screws 26, by means of which the two parts of the casing are held together. This diaphragm is made preferably of goldbeaters skin and is securely held between the edges of the casing portions 18 and 23. The diaphragm itself is not taut, but is preferably loosely crinkled or corrugated before being secured in position. This is done generally by wadding up the goldbeaters skin and rolling it between the hands preparatory to securing it in position. On each side of the diaphragm are metal plates 27, which are held by a nut 28 on a bolt 29, which projects through an opening 30 in the member 23 of the casing.

Secured to one end of the L-shaped frame 13 by means of a bolt 31 is a relatively thick U-shaped spring member 32. The frame 13 is slotted at 32a to allow for the shifting of a spring 33 for the purpose of keeping the spring at right angles to the bead chain. The spring member 33 is relatively thin and is carried by the U-shaped spring member 32, being fastened to it at 34. This spring member 33 extends substantially parallel with the diaphragm casing and has along a portion of one side adjacent its outer end a brace member 35 consisting of an integral strengthening rib formed in a blanking and forming operation. Between the brace member and the fastening means 34, the spring 33 is connected to the bolt 29. The outer end of the spring member 33 is slotted to receive the end of a bead chain 36. The latter passes around a wheel or pulley 37 which is mounted on an axle 38 journaled in bearings 39 carried by the forked ends 40 of the frame 13. Secured to the wheel 37 is the end 41 of a pointer arm 42. The latter extends forwardly to one side of the scale 10 and is provided with a laterally extending pointer 43. Since the scale 10 is curved on an arc concentric with the axis of the arm, the pointer 43 will swing along the scale at uniform distance therefrom. A plate 4x is provided, as shown in Figure 8, for preventing the light from shining through between the edge of the scale and the casing.

The spring arm 33 may be adjusted with respect to its support and with respect to the connection to the bolt 29, and to this end slots 44 and 45 are provided as shown in Figure 10. An adjusting screw 46 extends through the casing wall 3 and bears on the spring portion 32.

From the foregoing description of the various parts of the device, the operation thereof may be readily understood. The meter is designed to be attached to any suitable supporting surface and to this end lugs 47 are provided which may be secured by bolts 48 to a panel 49 or other convenient supporting surface. To the end of the threaded member 20, a flexible pipe 50 may be attached, and the end of this pipe may lead to a chimney, a furnace, or other device whose pressure or draft it is desired to indicate. The pressure from a fan, for instance, will cause a force which will act upon the diaphragm 24, moving it upwardly in Figure 1, and causing the spring 33 to rise. The wheel 37 has an adjustable counterweight 51, consisting of a pair of nuts, which may be locked together in adjusted positions so that when slack comes on the chain it will cause the arm to rise, thus shifting the pointer along the scale, said spring thus serving as simple means for calibrating, amplifying and transmitting movement of the diaphragm to the pointer bead chain 36. Should it be desired to measure a decrease in normal pressures, such as a partial vacuum, the air pressure will move the diaphragm in the opposite direction, pulling down on the spring and causing the swinging of the arm downwardly against the force exerted by the counterweight, so that the pointer will register on the lower part of the scale the extent of the decrease in pressure from the normal. Of course before the gauges are sent out they are calibrated and the pointer should stand at zero on the scale when the pressure is normal. If the pointer is not exactly at zero, it may be brought to the zero position by means of the screw 46 which may be turned to exert or relieve pressure on the spring 32. This may be done from the exterior of the housing without the necessity of opening it.

The construction described permits the use of plain flat plates for the sides of the housing or casing.

In Figure 5 we have shown a modified form of the device in which one housing serves for two pointers. In this figure the housing, which we have indicated in general at H, has a relatively large opening at O in the figure through which the pointers P and P' can be seen, and has two sets of diaphragms in the respective casings D and D'. The spring arms S and S' are connected, respectively, by means of chains with the wheels W and W' shown in Figure 6, which are connected with the pointers P and P'. The operation of this form of the device is the same as that already described. In this instance, however, the inlets to the diaphragm casing which are shown at K and K', respectively, may be connected to two different sources of pressure so as to give two readings in the single instrument. In this instance, as in the form shown in Figure 1, the diaphragm casings and their springs are disposed in compact arrangement at the ends of the housing so as to leave the greater part of the space within the housing for the free swing of the pointers. Both of these devices have adjusting screws A and A', by means of which the pointers may be brought to the zero position.

It will be noted that in both forms of the device elongated diaphragms are used and, as stated, this permits an instrument which may be made very narrow. We have found that an elongated diaphragm works as well, as far as transmission of pressure is concerned, as a circular diaphragm of the same area. By making the diaphragm elongated instead of circular, we gain the advantage of utilizing the available space in the compact case for useful purposes.

While we have illustrated a scale which is graduated in fractions of an inch (water), the instruments made on the same principle may be made for indicating greater pressures, such as blast pressure of 6 or 8 inches (water) or 30 inches water pressure for powdered coal air lines. The scale may be calibrated to read in inches mercury, in millimeters water or mercury, or in ounces and pounds per square inch, as well as in the units mentioned. These may be in pressure above atmospheric pressure, or suction (pressure below atmospheric), or the difference between pressures at two sources. Where the atmospheric pressure is taken as the standard of comparison, only one connection is necessary since the instrument itself is surrounded by atmospheric pressure which is naturally applied to the opposite side of the diaphragm.

The compact arrangement, in which the elongated diaphragm casing has a spring bent over it in parallel relation with an arm actuated by the spring at its outer end, enables us to multiply the movement of the diaphragm so that the pointer will move to a relatively great distance for a very slight pressure or vacuum, thus making a very sensitive instrument, but one which can be easily read at some distance from the gauge.

It will be noted that in the examples given the motion of the diaphragm is magnified by the use of the rigid extension on the spring and also by the use of the pulley. The wheels, or pulleys, give a constant factor of multiplication of the spring movement and we can, therefore, utilize pulleys of different sizes and thus get many different scale ranges with every other part of the unit standard.

We claim:

1. A pressure gauge, comprising a relatively narrow housing, an elongated diaphragm casing secured to a wall of the housing and having an inlet, a substantially rectangular diaphragm carried in said elongated casing, the surface of the diaphragm being crinkled and the edges being securely held by the walls of the diaphragm casing, a U-shaped spring portion rigidly secured in said housing and surrounding one end of the diaphragm casing, an adjusting screw mounted in the wall of the housing and arranged to engage the spring portion for flexing the latter, a relatively thin spring member secured to said U-shaped spring portion and extending substantially in parallelism with the diaphragm casing, a connection between said diaphragm and said spring member for moving the latter, a pointer arm pivotally mounted to swing in a plane substantially through the center of the housing and the longitudinal axis of the diaphragm, a wheel secured to the arm at its pivotal point and carrying a counterbalance for the arm, a bead chain for connecting the spring member with said wheel for moving the pointer arm, and an arc-shaped scale at one end of the housing, said scale being concentric with said wheel, and cooperating with the free end of the arm.

2. A pressure gauge, comprising a housing, an elongated diaphragm casing secured to a wall of the housing and having an inlet, an elongated diaphragm carried in said casing, the edges of the diaphragm being held by the walls of the casing and the body portion being crinkled, a spring member extending substantially in parallelism with the diaphragm casing, means for securing said spring member to said housing, a connection between said diaphragm and said spring member for moving the latter, a frame, a pointer arm pivotally mounted on said frame to swing through the greater portion of the housing, a wheel secured to the pointer arm at its pivotal point and carrying a counterbalance for the arm, flexible means for connecting the spring member with said wheel for moving the pointer arm, and an arc-shaped scale at one end of said housing, said scale being concentric with said wheel, and cooperating with the free end of the arm.

3. In a pressure gauge, a housing, an elongated diaphragm casing secured within the housing, a substantially rectangular diaphragm carried in said elongated casing, the surface of the diaphragm being crinkled and the edges being securely held by the walls of the diaphragm casing, a spring member disposed in parallelism with the diaphragm casing, connections between said diaphragm and said spring member for moving the latter, and means operated from without the housing for adjusting the position of the spring member.

4. In a pressure gauge, a housing, an L-shaped frame secured to said housing, a pointer arm pivotally mounted on one end of said L-shaped frame, a U-shaped resilient member having one leg mounted at the other end of said L-shaped frame, a spring member mounted on the other leg of said U-shaped resilient member and extending toward the first-named end of the frame, a diaphragm casing mounted on said frame between the spring member and the frame, a diaphragm carried in said diaphragm casing, connections between said diaphragm and said spring member for moving the latter, and connections between the spring member and the pointer arm for actuating the pointer arm.

5. In a pressure gauge, a housing, a frame disposed in said housing, an elongated diaphragm casing secured to said frame, a diaphragm disposed in said casing, a spring member disposed in parallelism with said diaphragm casing and secured to said frame, a pointer having its longitudinal axis disposed in the same plane with the longitudinal axis of the spring member and being pivoted at one end, connections between said diaphragm and said spring member for moving the latter, and connections between the spring member and the pointer for moving the pointer.

6. In a pressure gauge, a housing, an elongated diaphragm casing secured within the housing, a diaphragm in said casing, a spring member disposed in parallelism with the diaphragm casing on one side thereof, a U-shaped resilient member having a portion bent around the end of the diaphragm casing and arranged to extend in parallelism with the opposite side of the diaphragm casing, means for securing one end of said U-shaped member to the housing, means for securing the other end of said U-shaped member to one end of said spring member, connections between the diaphragm and the spring member for actuating the latter, a pointer pivotally supported at one end and having its longitudinal axis disposed in the same plane with the longitudinal axis of said spring member, and means for connecting the free end of said spring member with the adjacent end of the pointer for moving the pointer.

7. In a pressure gauge, a housing, an elongated diaphragm casing secured within the housing, a diaphragm in said casing, a spring member disposed in parallelism with the diaphragm casing on one side thereof, a U-shaped resilient member having a portion bent around the end of the diaphragm casing and arranged to extend in parallelism with the opposite side of the diaphragm casing, means for securing one end thereof to the housing, means for securing the other end of said U-shaped member to one end of said spring member, connections between the diaphragm and the spring member for actuating the latter, a pointer pivotally supported at one end and having its longitudinal axis disposed in the same plane with the longitudinal axis of said spring member, means for connecting the free end of said spring member with one end of said pointer for moving the pointer, and means carried by the housing and arranged to engage the resilient member for flexing said resilient member.

8. In a pressure gauge, a housing, an elongated diaphragm casing secured within the housing, a diaphragm in said casing, a spring member disposed in parallelism with the diaphragm casing on one side thereof, a U-shaped resilient member having a portion bent around the end of the diaphragm casing and arranged to extend in parallelism with the opposite side of the diaphragm casing, a frame for rigidly securing one end of the U-shaped resilient member to the housing, means for securing the other end of said U-shaped resilient member to said spring member, connections between the diaphragm and the spring member for actuating the latter, a pointer having its longitudinal axis disposed in the same plane with the longitudinal axis of said spring member, an extension carried by said frame for pivotally supporting said pointer, connections between the pointer and the spring member near the pivotal support of the pointer for turning the pointer on its pivot, and a curved scale adjacent to the free end of the pointer for indicating the movement of the pointer.

9. In a pressure gauge, a housing, an elongated diaphragm casing secured within the housing, a diaphragm in said casing, a spring member disposed in parallelism with the diaphragm casing on one side thereof, a U-shaped resilient member having a portion bent around the end of the diaphragm casing and arranged to extend in parallelism with the opposite side of the diaphragm casing, a frame for rigidly securing one end of the U-shaped resilient member to the housing, means for securing the other end of said U-shaped resilient member to said spring member, connections between the diaphragm and the spring member for actuating the latter, a pointer having its longitudinal axis disposed in the same plane with the longitudinal axis of said spring member, an extension carried by said frame for pivotally supporting said pointer, connections between the pointer and the spring member near the pivotal support of the pointer for turning the pointer on its pivot, a curved scale adjacent the free end of the pointer for indicating the movement of the pointer, and a set screw carried by the housing and arranged to bear on the resilient member for flexing the latter.

10. A pressure gauge, comprising a housing, a frame disposed in the housing and having extensions, an elongated diaphragm casing, a substantially rectangular diaphragm carried in said elongated casing, a spring member disposed in parallelism with the diaphragm casing, means whereby said spring member is carried by said frame, a connection between said diaphragm and said spring member for moving the latter when said diaphragm is moved, a pointer arm pivotally mounted in a plane substantially common to the central axis of the spring member, means connecting the end of the spring member with said pointer for moving the latter about its pivot, and an arc-shaped scale at one end of said housing for indicating the movement of the pointer arm.

11. In a pressure gauge, a housing, an elongated diaphragm casing carried within the housing, a diaphragm in said diaphragm casing, a spring member disposed substantially in parallel relation with said diaphragm, means connecting said diaphragm with said spring member for flexing the latter in a direction transverse to the major axis of the elongated diaphragm casing by movement of the diaphragm, means for permitting the shifting of the spring member parallel to the major axis of the elongated diaphragm casing and for securing the spring member at one end in its shifted position, a pointer arm, and a flexible connection between the free end of said spring member and the arm.

12. In a pressure gauge, a housing, a pointer pivoted in said housing, a diaphragm casing mounted in said housing, a diaphragm in said casing, an adjusting spring fixedly mounted at one of its ends in said housing, an elongated member including a calibrating spring fixedly secured to said adjusting spring, said elongated member being connected with said diaphragm and with said pointer whereby movement of said diaphragm flexes said calibrating spring to pivot said pointer, and means for flexing said adjusting spring to adjust the position of said pointer.

13. In a pressure gauge, a housing, a pointer pivoted in said housing, a diaphragm casing mounted in said housing, a diaphragm in said casing, a spring fixedly mounted at one of its ends in said housing, an elongated member fixedly carried by said spring, and connected at spaced points thereof with said diaphragm and said pointer, movement of said diaphragm shifting said elongated member to actuate said pointer, and means for flexing said spring to adjust the position of said pointer.

14. In a pressure gauge, in combination, a shiftable pointer, a diaphragm casing mounting a diaphragm, an adjusting spring secured in fixed relation to said casing at one of its ends, an elongated member including a calibrating spring fixedly secured to the free end of said adjusting spring, said elongated member being connected at spaced points thereof with said diaphragm and pointer whereby movement of the diaphragm flexes the calibrating spring to pivot said pointer, and means for flexing said adjusting spring to adjust the position of said pointer.

15. In a pressure gauge, a housing, a diaphragm casing carried within the housing, a diaphragm in said diaphragm casing, a spring member disposed substantially in parallel relation with said diaphragm, means connecting said diaphragm with said spring member intermediate its ends for flexing the latter by movement of the diaphragm, and means within the housing for mounting one end of said spring member, said spring mounting means being adjustable longitudinally of said spring to vary the position thereof relative to said connecting means and an indicator actuated by the free end of the spring.

16. In a pressure gauge, a housing, an elongated diaphragm casing carried within the housing, a diaphragm in said diaphragm casing, a spring member disposed substantially in parallel relation to said diaphragm, means connecting said diaphragm with said spring member intermediate its ends for flexing the latter in a direction transverse to the major axis of the elongated diaphragm casing by movement of the diaphragm, and means within the housing for mounting one end of said spring member, said spring mounting means being shiftable parallel to the major axis of the elongated diaphragm casing to vary the position thereof relative to said connecting means and a pointer connected to the free end of said spring.

PHILIP TRIPP SPRAGUE.
ARNOLD SOLLER.